(12) United States Patent
Rodriguez Romero et al.

(10) Patent No.: US 12,330,677 B2
(45) Date of Patent: Jun. 17, 2025

(54) METHOD TO IMPROVE PARKING ALIGNMENT

(71) Applicant: Valeo Schalter und Sensoren GmbH, Bietigheim-Bissingen (DE)

(72) Inventors: Mirian Rodriguez Romero, Troy, MI (US); Ovidiu Buzdugan Romcea, Troy, MI (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 207 days.

(21) Appl. No.: 18/051,329

(22) Filed: Oct. 31, 2022

(65) Prior Publication Data
US 2024/0140476 A1    May 2, 2024

(51) Int. Cl.
*B60W 60/00*   (2020.01)
*B60W 30/06*   (2006.01)
*B60W 50/14*   (2020.01)

(52) U.S. Cl.
CPC .......... *B60W 60/001* (2020.02); *B60W 30/06* (2013.01); *B60W 50/14* (2013.01); *B60W 2050/146* (2013.01)

(58) Field of Classification Search
CPC .... B60W 60/001; B60W 30/06; B60W 50/14; B60W 2050/146; B60W 50/08; G06V 20/586; G08G 1/168; B62D 15/0285
See application file for complete search history.

(56) References Cited

U.S. PATENT DOCUMENTS

| | | | |
|---|---|---|---|
| 2016/0300113 A1* | 10/2016 | Molin | G06T 7/80 |
| 2017/0297487 A1* | 10/2017 | Ali Khan | G08G 1/165 |
| 2018/0194344 A1 | 7/2018 | Wang et al. | |
| 2020/0086850 A1 | 3/2020 | Krekel et al. | |

(Continued)

FOREIGN PATENT DOCUMENTS

| | | |
|---|---|---|
| DE | 102012201038 A1 | 7/2013 |
| JP | 2022-117815 A | 8/2022 |

OTHER PUBLICATIONS

International Search Report & Written Opinion issued in corresponding International Application No. PCT/US2023/076583 mailed Feb. 8, 2024 (11 pages).

*Primary Examiner* — Abby Y Lin
*Assistant Examiner* — Dylan M Katz
(74) *Attorney, Agent, or Firm* — Osha Bergman Watanabe & Burton LLP (57) ABSTRACT

An automated parking system for parking a vehicle within a parking slot includes a communication device and an automated parking device. The communication device includes a display that depicts a visual representation of the vehicle within the parking slot. The communication device also includes a human machine interface (HMI) that receives user input and, according to the user input, relocates the visual representation of the vehicle to a user selected location. The user selected location is transmitted and received by data busses of the automated parking device. The automated parking device has a sensor that determines the location of various sides of the parking slot in relation to the vehicle. The automated parking device further includes an electronic control module that determines a path from the vehicle to the user selected location. The electronic control module proceeds to autonomously maneuver the vehicle along the determined path.

16 Claims, 7 Drawing Sheets

(56) References Cited

U.S. PATENT DOCUMENTS

| | | | |
|---|---|---|---|
| 2020/0225657 A1* | 7/2020 | Bettger | B62D 15/0285 |
| 2021/0309150 A1* | 10/2021 | Guo | H04N 5/2628 |
| 2021/0323537 A1* | 10/2021 | Fan | H04N 7/18 |
| 2023/0319218 A1* | 10/2023 | Ren | H04N 5/2624 382/284 |
| 2023/0365123 A1* | 11/2023 | Yamaguchi | B60W 30/06 |

* cited by examiner

METHOD TO IMPROVE PARKING ALIGNMENT

BACKGROUND

One of the most common applications of autonomous driving is parking a vehicle in a parking slot without receiving control from a user during the parking maneuver. Such is particularly useful in cases where a parking lot is crowded, as the user is more likely to crash into the surrounding vehicles, while the automated vehicle can maneuver crowded environments with ease. Furthermore, the automated vehicle does not experience stress from a crowded environment, while a user may desire to avoid parking in a parking slot due to a difficult parking situation in order to avoid the hassle thereof. This detrimentally impacts the user, as the user will have to park further from the desired location, and will have to spend more time looking for an available parking slot.

However, automated parking maneuvers are typically limited in that the vehicle will automatically park the vehicle in the center of the parking slot, without regard to how being located in the center of the parking slot affects a user. For example, if the parking slot is particularly shallow, the user may be unable to open the trunk of the automated vehicle without exiting the rear of the parking slot, while there may be unused space at the front of the parking slot that the user does not need. In addition, a user may desire to park closer to one side of the parking slot than the other, for purposes of loading groceries or passengers into the vehicle.

SUMMARY

An automated parking system for parking a vehicle within a parking slot includes a communication device and an automated parking device. The communication device includes a display that depicts a visual representation of the vehicle within the parking slot. The communication device also includes a human machine interface (HMI) that receives user input and, according to the user input, relocates the visual representation of the vehicle to a user selected location. The user selected location is transmitted and received by data busses of the automated parking device. The automated parking device has a sensor that determines a first location of a first side of the parking slot, a second location of a second side of the parking slot, and a third location of a rear side of the parking slot in relation to the vehicle, respectively. The automated parking device further includes an electronic control module that determines a path from the vehicle to the user selected location. The electronic control module proceeds to autonomously maneuver the vehicle along the determined path.

A method for parking a vehicle within a parking slot includes determining a first location of a first side of the parking slot, a second location of a second side of the parking slot, and a third location of a rear side of the parking slot in relation to the vehicle, respectively. The method further includes displaying a visual representation of the vehicle within the parking slot. The visual representation of the vehicle is relocated to a user selected location according to a user's input. The method further includes transmitting and receiving the user selected location of the visual representation of the vehicle within the parking slot, and determining a path from the vehicle to the parking slot such that an end of the path is located at the user selected location of the visual representation of the vehicle. Finally, the method includes autonomously maneuvering the vehicle along the determined path.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards methods and systems for automatically parking a vehicle within a parking slot. The system determines the geometry of the parking slot, including the length, width, and location of such. After determining the geometry of the parking slot, the system gathers user input regarding a user selected location for parking the vehicle within the parking slot. In addition, the system displays an open position of the door in relation to a side or rear of the parking slot, such that the user is able to determine the maximum operating position of the door of the vehicle while the vehicle is in the parking slot. After gathering the user's input, the system calculates a maneuver leading the vehicle from the vehicle's current position to the user's selected position based on the user's input. The system then issues actuation commands to an Electronic Control Module (ECM) of the vehicle, which actuates the vehicle to a user selected location within the parking slot.

Figure 1:
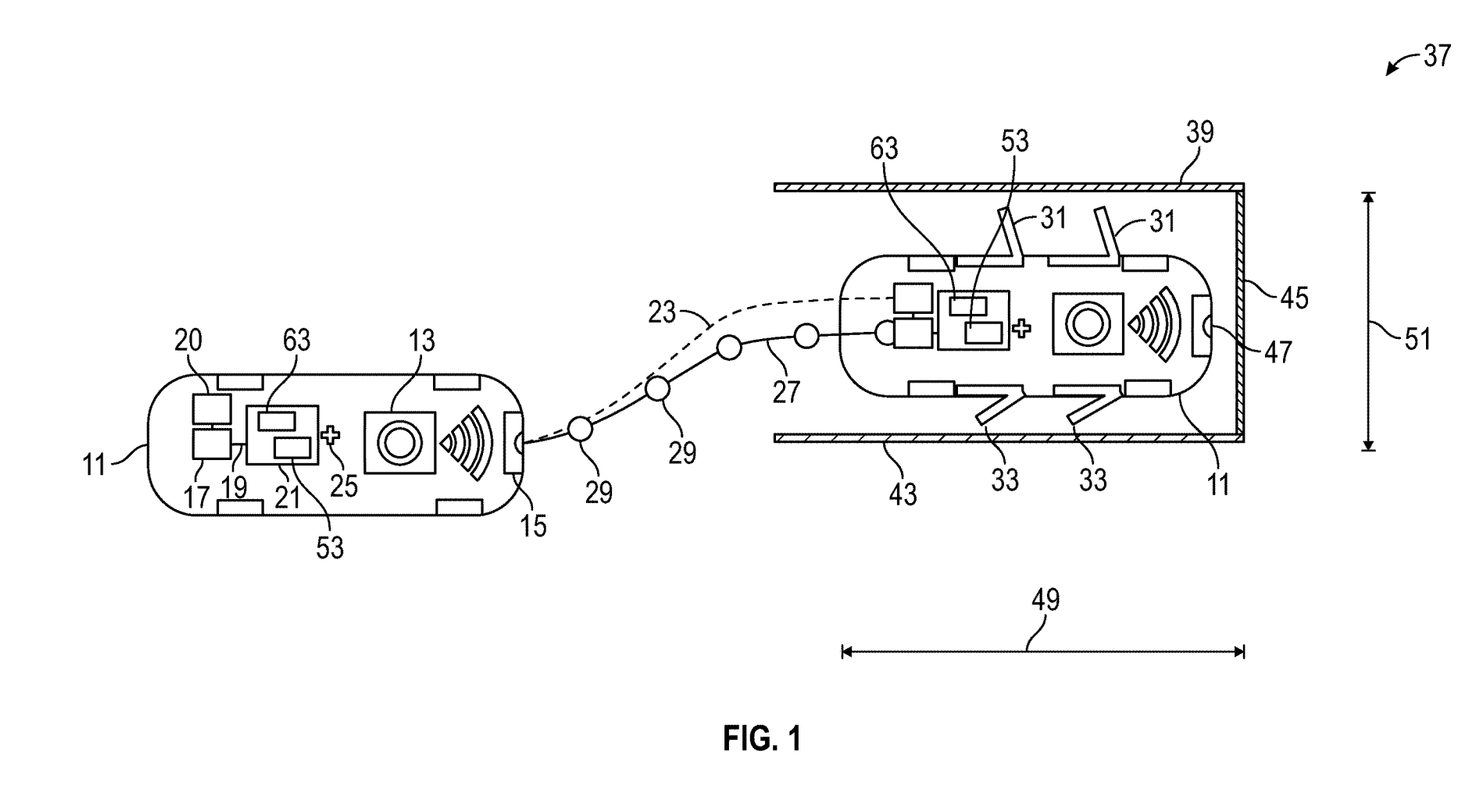
FIG. 1 shows a system in accordance with one or more embodiments of the invention.

FIG. 1 depicts an automated parking system for parking a vehicle 11 in a parking slot 37, which is formed of a first side 39, a second side 43, and a rear side 45. As shown in FIG. 1, the automated parking system of the vehicle 11 includes a first sensor 13 and a second sensor 15, which collect and transmit environmental data to an Electronic Control Module (ECM) 17 via a data bus 19. As described herein, the ECM 17 is one or more processors, microprocessors, logic units, controllers, and/or integrated circuits that receive, process, and transmit the environmental data, and subsequently issue commands to actuate the vehicle 11.

The ECM 17 is also coupled to a memory 20 that stores information on the dimensions of the car, including the length and width of the vehicle 11, the number of doors of the vehicle 11, the geometry of the doors of the vehicle 11, the position of the doors in relation to a coordinate system of the vehicle 11, and all exterior components of the vehicle 11. The memory 20 is a storage device like flash memory, Random Access Memory (RAM), a solid state or disk drive, server, or equivalent means of storing data. For example, the ECM 17 stores the type of vehicle 11 (e.g., coupe, sedan, truck, Sport Utility Vehicle (SUV), etc.) as well as the number of doors (e.g., 2 doors, 4 doors, etc.), as well as the number, dimensions, and locations of any other cargo spaces such as front and rear cargo spaces (commonly referred to as "trunks"), truck beds, or equivalent. In addition, dimensions of the car may be input, for example, to the storage by the vehicle manufacturer. The dimensions may also be input or edited by the user in case the user attaches aftermarket accessories to the vehicle 11 or the dimensions of the door(s) otherwise change.

Similar to the ECM 17, the data bus 19 is a series of wires, optical fibers, printed circuits, or equivalent structures for transmitting signals between computing devices. Furthermore, although described above as a physical connection, the data bus 19 may alternatively be embodied as a virtual network connection between computing devices, such as Wi-Fi, Bluetooth, Zigbee (trademarked), Long-Term Evolution (LTE), $5^{th}$ Generation (5G), Internet of Things (IoT), or other equivalent forms of networking communication. Thus, the data bus 19 forms one or more transmitter(s) and receiver(s) between the various components described herein.

Upon powering the vehicle 11, the first sensor 13 and the second sensor 15 capture the environmental data, and begin transmitting the data to the ECM 17. The environmental data may include data pertaining to the location of the first side 39 of the parking slot 37, the second side 43, the rear side 45, and obstacles (not shown) such as pedestrians, other vehicles, or buildings. To collect the environmental data, the first sensor 13 and/or second sensor 15 may include one or more of a camera, LiDAR sensor, radar sensor, ultrasonic sensor, or other optical sensors, and the first sensor 13 may be the same sensor type or a different sensor type from the second sensor 15. The number of sensors is not limited to two, and may include any number of sensors without departing from the nature of the invention.

Furthermore, the vehicle 11 may receive environmental data from other sensors that are not present onboard the vehicle 11, but are still aware of the environment of the vehicle 11. Such other sensors and/or data may include, for example, sensors onboard other vehicles in the vicinity of the vehicle 11, data from a user's smartphone, or data from other devices in the environment or surrounding infrastructure. The data may be transmitted through any number of means to the vehicle 11 using wireless signals such as Wi-Fi, cellular data, Bluetooth, Vehicle to Vehicle (V2V) communication, or equivalent.

The first sensor 13 and second sensor 15 receive data on the environment of the vehicle 11 in the form of images, if the first sensor 13 and/or second sensor 15 are cameras, or two-dimensional (2D) or three-dimensional (3D) positional information of a reflected wave, if the first sensor 13 and/or second sensor 15 are LiDAR, radar, or ultrasonic sensors. By way of non-limiting example, if a vehicle 11 is equipped with an ultrasonic sensor, the ultrasonic sensor will emit high-frequency sound waves that reflect off of an object, and the ECM 17 will calculate the Time of Flight (TOF) of the sound wave, or the time required for the sound wave to return to the ultrasonic sensor. Based upon the medium that the sound wave travels through, the ECM 17 determines the distance from the ultrasonic sensor to the object. Subsequently, the ECM 17 utilizes a trilateration, multilateration, triangulation, or similar procedure to determine the location of the vehicle 11 in relation to the object. Accordingly, the vehicle 11 is capable of determining the position of objects in its environment using data captured by the first sensor 13 and/or second sensor 15.

After capturing the environmental data, the first sensor 13 and second sensor 15 then transmit their environmental data to the ECM 17 via a data bus 19, and the ECM 17 coalesces the data to form a map depicting the locations of various objects in the environment of the vehicle. Combining and synthesizing the data into the map from the sensors may be performed by a sensor fusion algorithm, which relates information from one type of sensor to information from a second type of sensor. For example, in the case of an ECM 17 receiving a two-dimensional image including an object and positional information of an object from an ultrasonic sensor, the ECM 17 correlates the positional information of the object to the location of the object on the image. The ECM 17 may perform early sensor fusion, where objects are identified prior to combining sensor data, or late sensor fusion, where objects are identified subsequent to combining the sensor data.

To identify objects within the environment, the ECM 17 performs feature extraction on the environmental data using an object detection algorithm. For example, the ECM 17 processes the sensor data through a Convolutional Neural Network (CNN), such as LeNet, AlexNet, ResNet, or equivalent, where a section of the data is initially processed through a series of convolution operations. The convolution operations determine the probability of a feature being located within the data. Once the optical data is convoluted, the optical data is processed through pooling operations, which down sample the optical data into a useful feature map based on the neural network's training. As the optical data also includes the three-dimensional locations of the scanned objects, once the feature extraction is complete the vehicle 11 knows the identity and location of an object within the environment. In addition, the ECM 17 of the vehicle 11 calculates the length 49 and width 51 of the parking slot 37 based upon the locations of the first side 39, second side 43, and rear side 45 of the parking slot 37. Those of ordinary skill in the art will appreciate that the above CNN is one example for performing object detection, and does not limit the scope herein. For example, the ECM 17 may use one or more Artificial Neural Networks (ANN), Regular Neural Networks (RNN), or any equivalent form of sensor data processing without departing from the nature of the invention.

To traverse the environment of the vehicle 11, the ECM 17 is further configured to determine a path for the vehicle 11 to maneuver to an end location within the parking slot 37. Specifically, once the ECM 17 has performed feature extraction, the ECM 17 uses a path planning algorithm to create a series of waypoints 29, or virtual coordinates, that lead from the vehicle 11 to a user selected location 47 within the parking slot 37 along a planned path 27. Furthermore, the ECM 17 continues to receive environmental data from the first sensor 13 and second sensor 15, such that the ECM 17 may revise the planned path 27 if the environmental data indicates a change in the surroundings of the vehicle, such as a moving pedestrian. An ECM 17 may further use localization algorithms, such as Simultaneous Location and Mapping (SLAM) or Vision Odometry (VO), that determine the location of the vehicle 11 using the surrounding environment and the extracted features.

Consistent with the above, the path planning algorithm is a series of computational operations performed by the ECM 17 that determine a valid sequence of motions that translate the vehicle 11 to the user selected location 47. Nonlimiting examples of path planning algorithms as described herein include A*, D*, Probabilistic Roadmap, Rapidly-exploring Random Trees (RRT), RRT*, Dijkstra's algorithm, or equivalent path planning algorithms. Based upon the path planning algorithm, the ECM 17 creates a map that encompasses the environment and identified objects thereof, and subsequently navigates the vehicle 11 through the environment to the user selected location 47. In addition, the ECM 17 restricts the path planning algorithm based upon the dimensions of the vehicle, such that the path planning algorithm disregards paths that would cause the front, rear, or sides of the vehicle 11 to extend beyond the limits of the parking slot 37. Such path planning limitations may be further implemented by restricting the user selected location 47 of the vehicle 11 on the center console 21, where the user is only able to manipulate the vehicle 11 within the parking slot 37, and cannot select a restricted location as a user selected location 47.

As shown in FIG. 1, a sample path 23 of a vehicle 11 would position the vehicle center 25 in the center of the parking slot 37 such that the vehicle center 25 is equidistant between the first side 39 and second side 43 of the parking slot 37. However, a centered vehicle may be disadvantageous in situations where a user of the vehicle 11 desires to use the driver side doors 31 on one side of the vehicle 11, and does not need to use the passenger side doors 33. For example, if a user is trying to load a child into the driver's side of the vehicle, the user may desire to park closer to the second side 43 of the parking slot 37 in order to open the driver side doors 31 of the vehicle 11 to their maximum operating position. Thus, in such situations, it is advantageous if a planned path 27 of the vehicle 11 positions the vehicle center 25 closer to the second side 43 of the parking slot 37.

Accordingly, determining a planned path 27 to the user selected location 47 of the vehicle 11 includes determining the operating position of the driver side doors 31 and the operating position of the passenger side doors 33. More specifically, the dimensions of the vehicle 11, including the dimensions of the driver side doors 31 and the passenger side doors 33, as well as the position of the driver side doors 31 and the passenger side doors 33 relative to a coordinate system of the vehicle 11, are stored in the memory 20 of the vehicle 11. The ECM 17 determines the furthest point of the driver side doors 31 and passenger side doors 33 from the vehicle 11 based upon trigonometric calculations, assuming that the driver side doors 31 and passenger side doors 33 will always be at their maximum operating position prior to abutting against a side of the parking slot 37.

By way of nonlimiting example, and as noted above, the ECM 17 is aware of and stores in local memory the dimensions of the vehicle 11, the driver side doors 31, the passenger side doors 33, and the width 51 of the parking slot 37. Thus, the ECM 17 determines the distance between the outermost point of the body of the vehicle 11 (other than the doors) and a side of the parking slot 37 by subtracting one half of the width of the vehicle 11 from the known distance between a vehicle center 25 and a first side 39 of the parking slot 37. This distance is determined to be the maximum distance that driver side doors 31 may be opened. Based upon the determined opening distance and a location of a connection point of the door to the vehicle 11, the ECM 17 performs one or more trigonometric calculations, such as a sine, cosine, tangent, or similar function and/or the Pythagorean theorem, to determine the operating angle, the opening percentage (e.g., 25% open, 50% open, etc.), and the position of the driver side doors 31. Similar calculations may be performed by the ECM 17 to determine the operating angle and position of the passenger side doors 33.

To capture the user selected location 47, the ECM 17 of the vehicle 11 is communicably coupled, via the data bus 19, to a center console 21, which forms a communication device for the user to interact with the vehicle 11. As described below, the center console 21 includes a display 53 that displays a visual representation of the location of the vehicle 11 within the parking slot 37. To interact with the display 53, the center console 21 further includes a Human Machine Interface (HMI) 63 such as a touchscreen, dial(s), button(s), or knob(s), and transmits user input captured with the HMI to the ECM 17. Accordingly, the user's captured input manipulates the visual representation within the parking slot 37, and the user selected location 47 is transmitted from the center console 21 to the ECM 17 via the data bus 19.

After a user has finished inputting commands, the ECM 17 captures the location of the vehicle center 25 in relation to the parking slot 37, and sets the captured location as the end point of the planned path 27. Thus, the planned path 27 is formed as a path from the vehicle center 25 at its current location to the user selected location 47 of the vehicle center 25 on the center console 21. Based upon the planned path 27, the path planning algorithm calculates the series of waypoints 29 along the planned path 27, and the vehicle 11 traverses the planned path 27 until the vehicle center 25 is aligned at the user selected location 47.

Those skilled in the art will appreciate that the parking slot described in FIG. 1 may be a slot in an open parking lot, a slot in a parking garage, a parallel parking slot on a street, or any other suitable parking slot into which a driver may maneuver a vehicle for purposes of getting in and out of the vehicle. Further, a parking situation may be a situation in which the driver may wish to have more space to open a door on either the driver's side (e.g., if there are only persons sitting on the driver's side of the vehicle), or the passenger's side (e.g., if there are persons that need to be accommodated to exit and enter the vehicle on the passenger's side). For example, the vehicle may be parked in a tight spot, requiring the vehicle to be positioned offset in the slot, and not centered within the slot in order to operate the driver's side door to its maximum possible opening angle, percentage, or distance.

Furthermore, the parking slot as described herein includes any location at which a vehicle desires to park. Thus, the first side 39 of the parking slot 37 may be alternatively embodied as an object (such as a pedestrian, shopping cart return area, wildlife, or similar obstacles) that restricts the motion of the driver side door 31 or the passenger side door 33. The parking slot 37 may also be delimited by poles or other physical parking aids, and may be formed of dashed lines. Additionally, the parking slot 37 may only be formed of one side such as in a parallel parking situation. Thus, the number of sides or specific geometry of the parking slot 37 is nonlimiting, as the parking slot 37 varies according to the use case of the vehicle 11.

Figure 2:
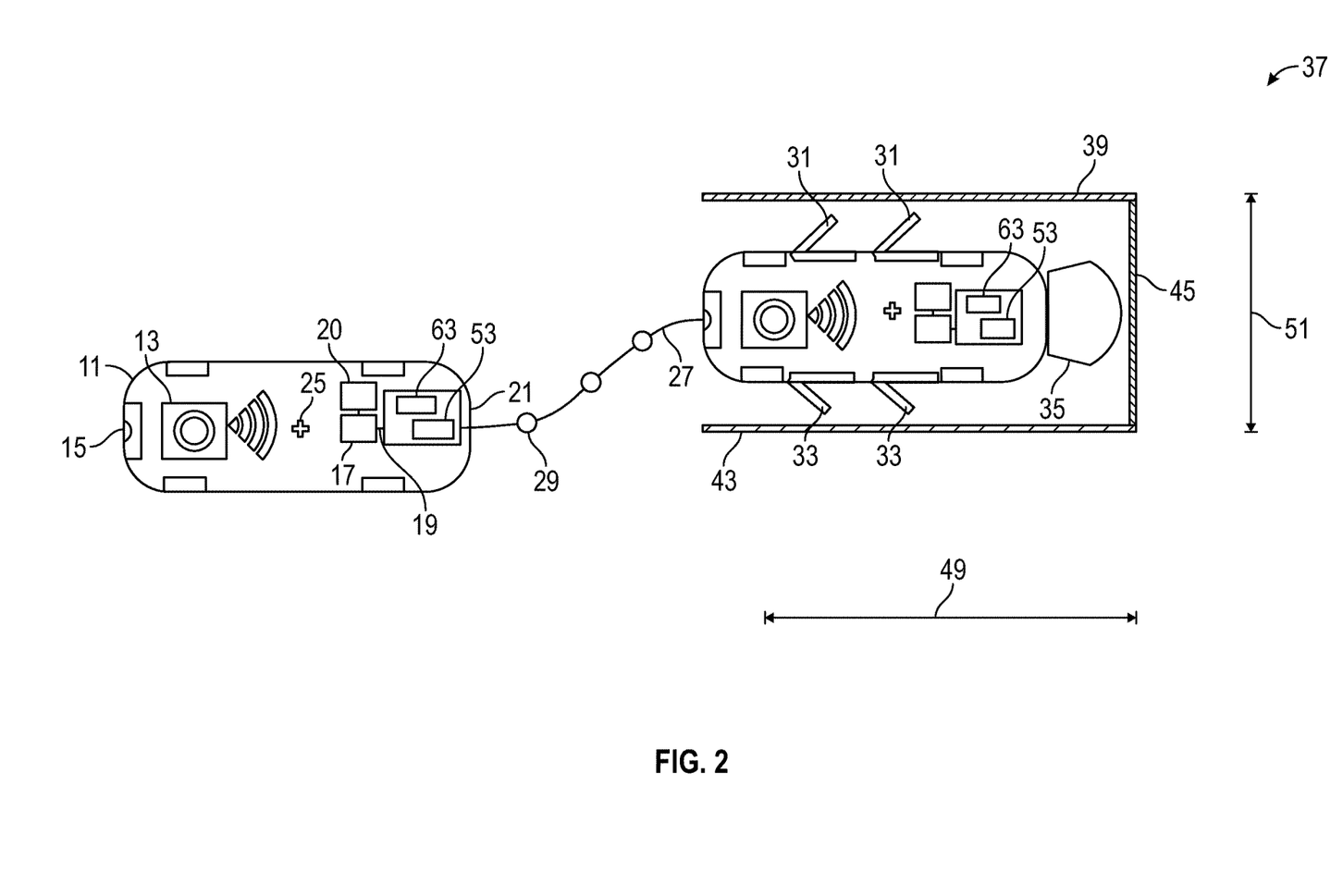
FIG. 2 shows a system in accordance with one or more embodiments of the invention.

FIG. 2 depicts a system overview of a second automated parking system in accordance with one or more embodiments of the invention. More specifically, FIG. 2 depicts a situation where a user wishes to park such that a rear door 35 of the vehicle 11 is in a fully open position. Such a situation is applicable, for example, where a user may wish to load groceries or large items into the trunk or tailgate of a vehicle. As shown in FIG. 2, the vehicle center 25 is located towards the front of the parking slot 37 such that the rear door 35 is able to be opened to its maximum operating position.

In order to park the vehicle 11 closer to the front of the parking slot 37, an ECM 17 of the vehicle 11 computes the length 49 of the parking slot 37 according to procedures described above. The ECM 17 then retrieves the dimensions of the vehicle 11 from a memory 20, including the dimensions of the rear door 35 and the location of the vehicle center 25, and subtracts the length of the vehicle 11 from the length 49 of the parking slot 37. The ECM 17 determines the subtracted difference to be the operable distance that the rear door 35 may open, and positions the vehicle center 25 such that the front of the vehicle 11 is in line with the edges of the first side 39 and second side 43 of the parking slot 37. Alternatively, if the subtracted difference exceeds the length of the rear door 35, the ECM 17 determines that the rear door 35 may be opened to its maximum operating position.

Figure 3:
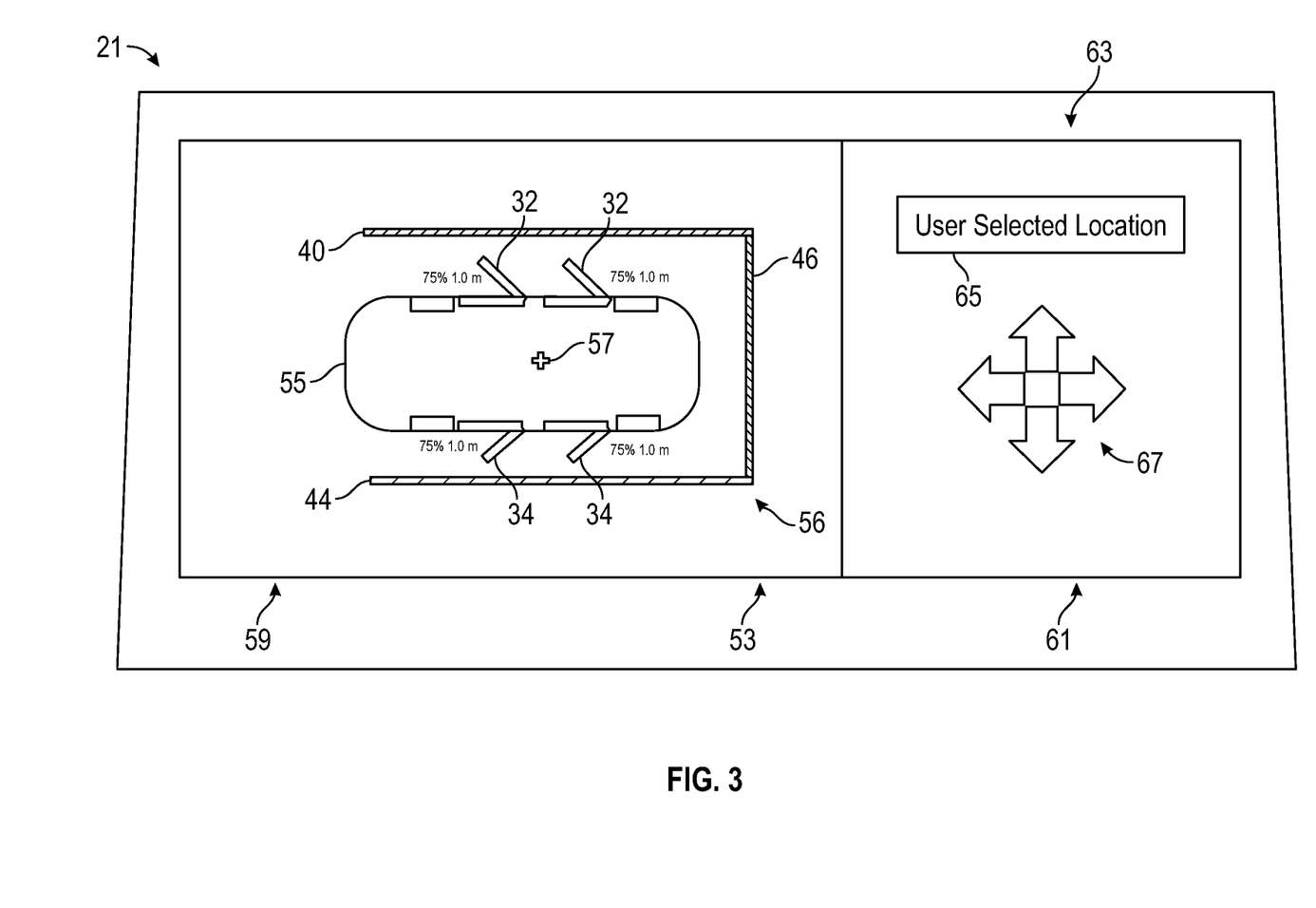
FIG. 3 shows a vehicle center console in accordance with one or more embodiments of the present disclosure.

FIG. 3 depicts a center console 21 in accordance with one or more embodiments of the invention. As shown in FIG. 3, the center console 21 includes a display 53 and a touchscreen 63. The display 53 may be a Liquid Crystal Display (LCD), Organic Light-Emitting Diode (OLED), a projected display, a display of a user's smartphone/tablet, or equivalent display. The display 53 includes a first display portion 59 that displays a two-dimensional overhead view of a visualized vehicle 55 within a visualized parking slot 56 that is formed of a first side 40, a second side 44, and a rear side 46. The visualized vehicle 55 forms a visual representation of the vehicle 11 for the user, such that the user can better envision the parking situation of the vehicle 11. Similarly, the visualized parking slot 56 forms a visual representation of the parking slot 37. The visualized vehicle 55 and the visualized parking slot 56 are proportional to the vehicle 11 and parking slot 37, respectively. In addition, the display 53 includes a second display portion 61 that displays a status indicator 65 of the visualized vehicle 55 and buttons 67 for manipulating the visualized vehicle 55 within the visualized parking slot 56.

To capture input from the user, the center console 21 further includes a touchscreen 63, which is disposed on top of the display 53 and forms an HMI as described herein. The touchscreen 63 may be a capacitive touchscreen, a resistive touchscreen, or equivalent, and converts a user's touch to an input to the display 53 as is commonly known in the art. Thus, the touchscreen 63 allows a user to interact with the buttons 67 of the display 53, which, in turn, causes the visualized vehicle 55 to relocate within a visualized parking slot 56 as described below.

As shown in FIG. 3, the status indicator 65 denotes that the visualized vehicle 55 is in the default position when a visualized vehicle center 57 of the visualized vehicle 55 is equidistant between a first side 40 and a second side 44 of a visualized parking slot 56. In this position, the ECM 17 assumes that visualized driver side doors 32 and visualized passenger side doors 34 of the visualized vehicle 55 are open equal amounts, and the visualized vehicle 55 is centered within the visualized parking slot 56. In addition, to assist a user with determining the best location to position the visualized vehicle 55, the display 53 displays the percent that each door may be opened, and the distance between the furthest point of the visualized door and the visualized vehicle 55. More specifically, the ECM 17 calculates the position of the visualized driver side doors 32 and visualized passenger side doors 34 as a ratio of a stored maximum operating position of the doors, and displays the ratio as a percentage on the display 53 for each door. In addition, the ECM 17 calculates the distance between the furthest point of the visualized door and the visualized vehicle 55 as described above, and generates the distance on the display 53 such that the user is informed of the operating position of the various doors.

In order to shift the location of the visualized vehicle 55 within the visualized parking slot 56, a user presses the touchscreen 63 at the location of the buttons 67 as described above. The ECM 17 of the vehicle 11 shifts the location of the visualized vehicle 55 on the display 53, and, concurrently, updates the memory 20 with the visualized vehicle center 57 of the visualized vehicle 55. Simultaneously, the ECM 17 calculates the maximum opening distance of the various doors of the vehicle 11 and stores the distance and opening percent in the memory 20, while also displaying the information on the display 53 as described above. Once an initial user input is received, the display 53 updates the status indicator 65 from "Default Position" to "User Selected Location", as shown in FIG. 4.

Figure 4:
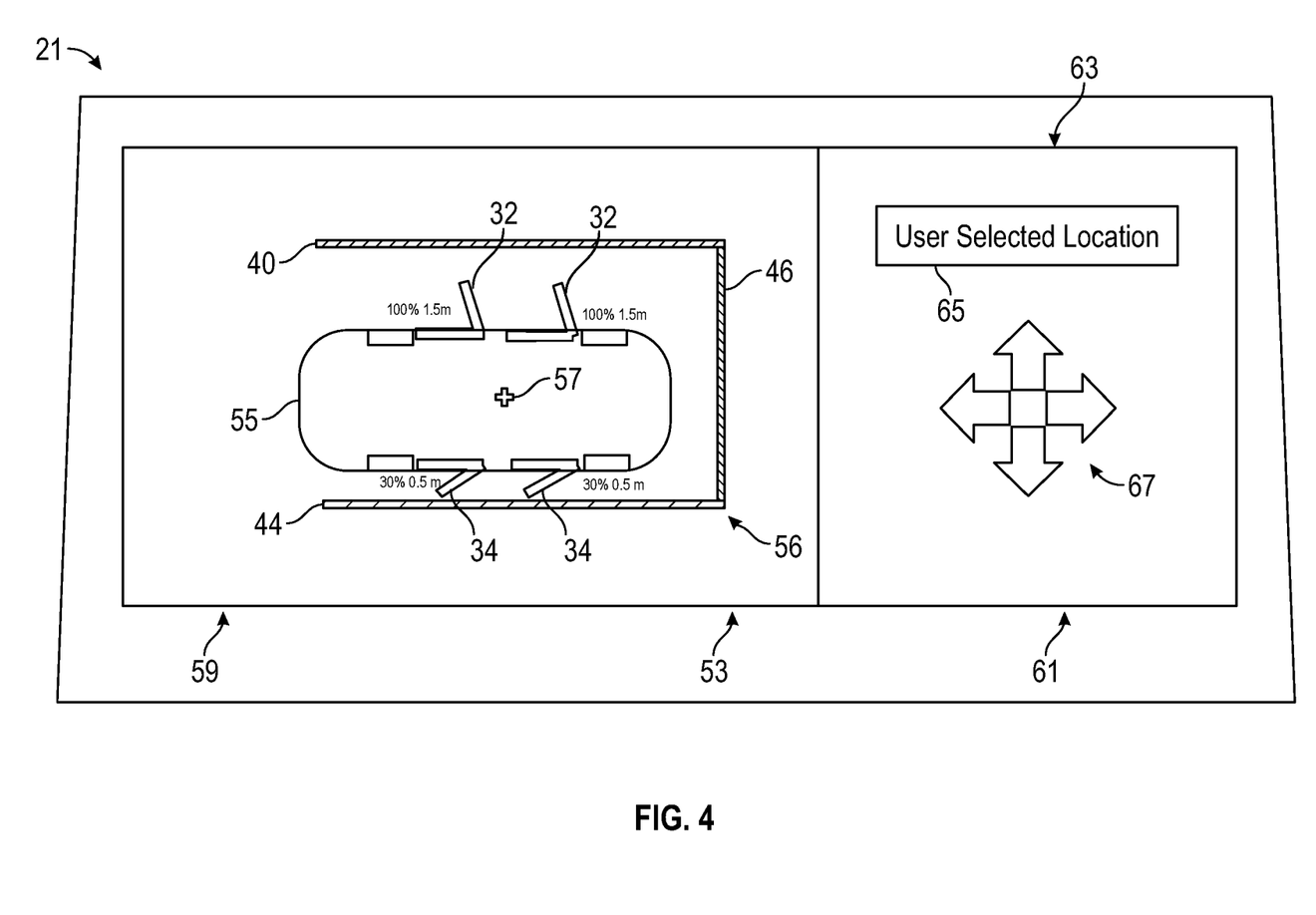
FIG. 4 shows a vehicle center console in accordance with one or more embodiments of the present disclosure.

FIG. 4 depicts one example of a visualized vehicle 55 in a user selected location 47 in accordance with one or more embodiments of the invention as described herein. As shown in FIG. 4, the visualized vehicle center 57 is closer to a second side 44 of the visualized parking slot 56 than a first side 40 thereof. Accordingly, visualized passenger side doors 34 of the visualized vehicle 55 are shown to have an opening distance of 0.5 meters (m), while visualized driver side doors 32 of the visualized vehicle 55 have a greater opening distance of 1.5 m. As described above, the calculation of the open position of the doors involves trigonometric calculations and functions routine to a person of ordinary skill in the art.

The ECM 17 can receive confirmation of the user selected location 47 in a variety of ways. For example, the ECM 17 may be configured to wait a predetermined period of time (e.g., 5 seconds) without receiving additional user input, at which point the ECM 17 determines the last user input to be the user selected location 47. In such cases, the ECM 17 may issue a message on the display 53 that alerts the user that the vehicle 11 is proceeding to the user selected location 47. Alternatively, and although not shown in FIG. 4, the display 53 may issue a prompt requesting that the user confirms the user selected location 47, and does not proceed to the user selected location 47 until the user confirms the user selected location 47 by interacting with the prompt. As another example, the display 53 may display a confirmation button (not shown) for the entire process of a user selecting a location, at which point the user clicks the confirmation button (not shown) to initiate the maneuver.

Based upon the relocation and subsequent confirmation thereof, an ECM 17 of the vehicle 11 determines a planned path 27 to the user selected location 47 according to a path planning algorithm. Specifically, once the user confirms the user selected location 47 on the display 53, the ECM 17 performs a scaling function to transform the user selected location 47 as an input to the path planning algorithm. In order to do such, the ECM 17 determines the locations of pixels depicting the visualized vehicle center 57 in relation to the visualized parking slot 56, which may be pulled from software stored on the memory 20. The ECM 17 then maps each pixel to a specific location within the visualized parking slot 56, and sets the input of the path planning algorithm as the point in the parking slot 37 corresponding to the location of the visualized vehicle center 57. Alternatively, the ECM 17 may calculate the vertical and horizontal distances (in pixels) between the visualized vehicle 55 and the various visualized sides, of the visualized parking slot 56 and scale the distances according to the known physical length of the sides in contrast to the length of the pixels that form the visualized sides. In yet another example, the ECM 17 may determine, prior to displaying an image of the visualized parking slot 56 on the display 53, that a single press of a button 67 corresponds to a fixed distance or portion of the visualized parking slot 56. The ECM 17 then records the number of presses of each button 67, and sets the input of the path planning algorithm to be the center of the parking slot 37, shifted according to the respective button 67 presses. Furthermore, the ECM 17 may correlate pixels to real world coordinates, and determine the planned path as a function of the real world coordinates.

Thus, as a whole, the vehicle 11 is able to receive user input via the touchscreen 63, display a user selected location 47 via the display 53, and determine and follow a path to the user selected location 47 via the ECM 17. After initiating the maneuver, the display 53 may display the status of a maneuver by displaying the planned path 27, the position of the vehicle 11 and obstacles along the planned path 27, and, after the maneuver is complete, the maximum operating position of the doors 31, 33, according to the user selected location 47. Finally, once the maneuver is complete, the display 53 may issue a notification to the user that the maneuver is complete, and details of the maneuver such as any route changes and the total time to complete the maneuver.

Figure 5:
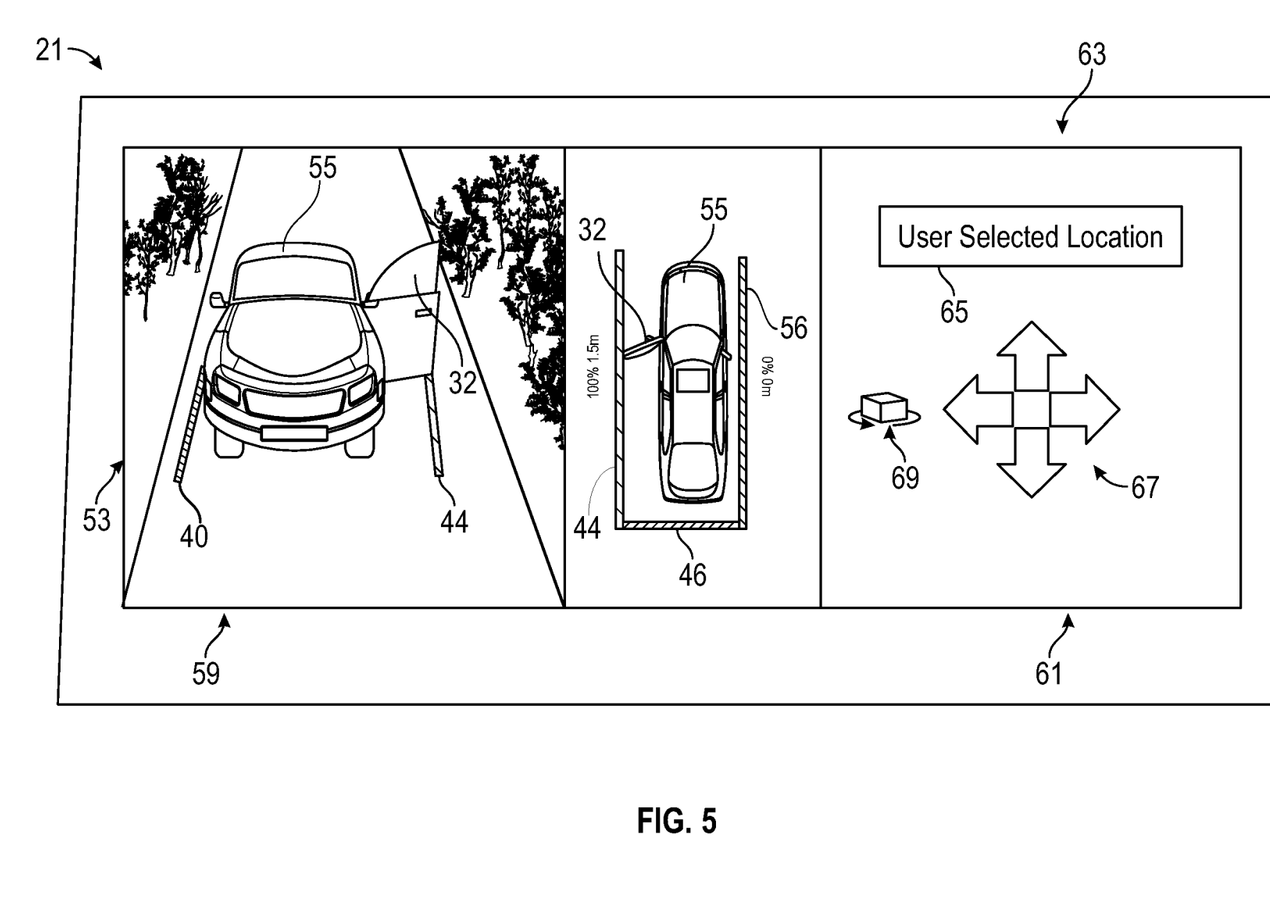
FIG. 5 shows a vehicle center console in accordance with one or more embodiments of the present disclosure.

FIG. 5 depicts another embodiment of a center console 21 consistent with one or more embodiments of the invention as described herein. As shown in FIG. 5, the display 53 displays a three-dimensional bowl view of a visualized vehicle 55 in a visualized parking slot 56. The visualized parking slot 56 is formed of a first side 40, a second side 44, and a rear side 46, and the visualized vehicle 55 is depicted within the visualized parking slot 56 such that the visualized vehicle 55 may obscure portions of the sides of the visualized parking slot 56 to provide a more realistic view to a user. In addition, the visualized vehicle 55 is shown in two views, where the first view is a user-manipulated view using the buttons 67 and orientation button 69, and the second view is an overhead view of the visualized vehicle 55 that displays the positions of the various doors of the vehicle.

In order to adjust a user's view of the visualized vehicle 55, the second display portion 61 includes an orientation button 69. If the user desires to change the view of the visualized vehicle 55, the user may touch and drag the orientation button 69, which rotates the visualized vehicle 55 around the visualized vehicle's center (not shown). Furthermore, or in the alternative, the user may directly interact with the visualized vehicle 55 on the first display portion 59, and the display 53 rotates the visualized vehicle 55 about its center according to the user's input. It is noted that buttons 67 will translate the visualized vehicle 55 within the visualized parking slot 56 in both the first and second views, while the orientation button 69 will only change the orientation of the first view, and does not affect the second (overhead) view.

In addition to the above, the display 53 is further configured to display the operating position of any visible doors of the vehicle. For example, and as seen in FIG. 5, a user selected location 47 has relocated the visualized vehicle 55 such that the visualized vehicle 55 abuts against the first side 40 of the visualized parking slot 56. Thus, the passenger side doors 33 are unable to be opened without crossing over the second side 43, and the ECM 17 determines that the passenger side doors 33 must remain closed. In addition, the ECM 17 determines that the driver side doors 31 are able to be opened to their fullest position, while the rear door of the vehicle will also remain closed.

The ECM 17 subsequently commands the display 53, via a data bus 19 (e.g., FIG. 1), to display the opening position of the visualized driver side doors 32 as 100% and 1.5 meters (m). The percentages and measurements depicted and described herein are not indicative of requirements for a vehicle, and are exemplary only. Rather, the door(s) of a vehicle may be of any suitable dimension or geometry, and may differ from door to door. As the displayed orientation of the visualized vehicle 55 obscures the user's view of the visualized passenger side doors 34, the display 53 will not display the opening position of the obscured door(s). Similarly, as the display 53 superimposes the image of the visualized vehicle 55 on top of the visualized parking slot 56, portions of the first side 40, second side 44, and rear side 46 of the visualized parking slot 56 are obscured. Such has the benefit of reducing the amount of information presented to a user, and allows the user to better determine an appropriate spot to park the vehicle 11 within the parking slot 37.

Figure 6:
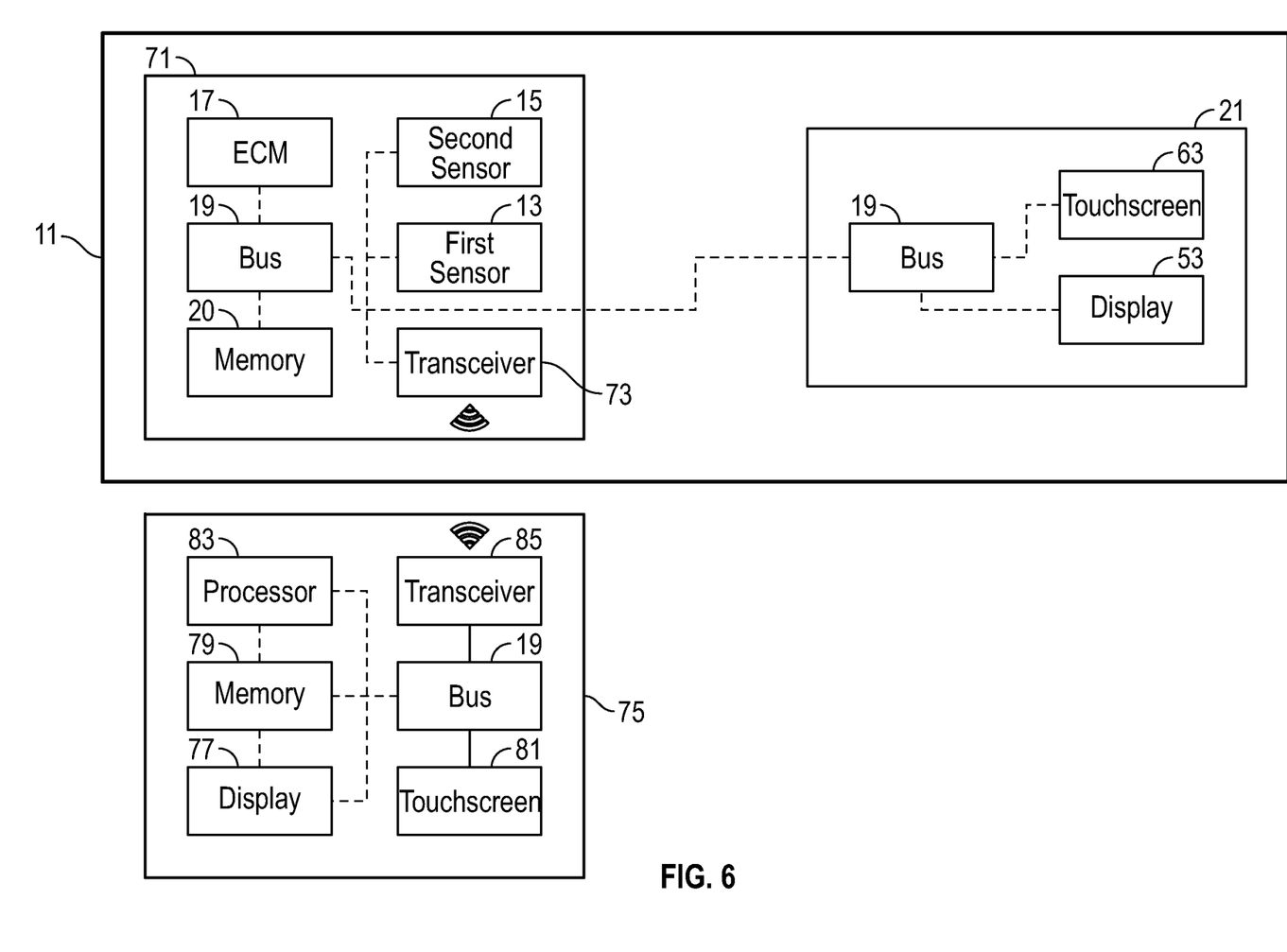
FIG. 6 shows a system in accordance with one or more embodiments of the present disclosure.

FIG. 6 depicts a system overview of an automated parking system in accordance with one or more embodiments of the invention. As shown in FIG. 6, the automated parking system includes a vehicle 11 and a smartphone 75. The vehicle 11 includes an automated parking device 71 including a first sensor 13 and/or a second sensor 15, which may be an optical sensor such as a camera, radar unit, LiDAR unit, ultrasonic sensor, or other equivalent sensors known to a person of ordinary skill in the art. Alternatively, the vehicle 11 may receive information on the parking slot 37 from other sensors embedded, for example, in local infrastructure such as other vehicles, buildings, parking meters, or similar equipment capable of transmitting wireless signals to the vehicle. That is, the sensors may be mounted on or in the vehicle, or may be exterior to the vehicle. As described above, the first sensor 13 and/or the second sensor 15 transmit captured data to the ECM 17, which is a processor, microprocessor, or circuit that performs processing of the various data described herein. The ECM 17 processes the data using an object detection algorithm to extract features such as parking slots 37, obstacles, and the vehicle 11 location, from the captured data.

After capturing the optical data, the first sensor 13 and the second sensor 15 transmit the captured data to a memory 20. The memory 20 is a non-transitory storage medium such as flash memory, Random Access Memory (RAM), a Hard Disk Drive (HDD), a solid state drive (SSD), a combination thereof, or equivalent. In addition to storing the captured optical data, the memory 20 also stores trigonometric functions, dimensions of the vehicle 11, inputs, outputs, functions, and processes necessary to perform feature extraction, localization, path planning, autonomous maneuvering of the vehicle 11, user interaction(s) (via a center console 21), and other functions and processes described herein.

The automated parking device 71 is further connected to a center console 21 in order to receive a user input and a desired location of the vehicle 11 within a parking slot 37 as described above. As shown in FIG. 6, a data bus 19 of the automated parking device 71 is coupled to a data bus 19 of the center console 21. The data bus 19 transmits data using wires, a printed circuit board, or other equivalent means of sending data between the various components. In relation to the vehicle 11, the data bus 19 of the automated parking device 71 further interconnects the constituent components thereof, which include the first sensor 13, the second sensor 15, the ECM 17, and a data bus 19 of a center console 21. On the other hand, the data bus 19 of the center console 21 interconnects the touchscreen 63 and display 53 to the data bus 19 of the automated parking device 71. The interconnection of the various components formed by the data bus 19 accordingly provides the ECM 17 with the user's input via a touchscreen 63 and display 53, while also connecting the ECM 17 to the remaining components of the automated parking device 71.

In order to provide further usability and ease of access to a user of the automatic parking system, the automated parking device 71 includes a transceiver 73, which wirelessly transmits and receives signals to and from a transceiver 85 in a smartphone 75 of the user. Example embodiments of the transceivers include an antenna (not shown) and processor (not shown) that transmit and receive radar, radio, cellular, satellite, Wi-Fi, or other equivalent signals. The automated parking device 71 and smartphone 75 may also be part of a network of devices, in which case the transceivers may transmit or receive signals of different and/or multiple signal types.

The transmitted signals replicate the view of the center console 21, which includes a two-dimensional or three-dimensional visualization of the vehicle 11, as well as buttons 67 (and an orientation button 69, if applicable) to manipulate the visualization and associated prompts. As the smartphone 75 also includes a data bus 19, a display 77, a memory 79, a touchscreen 81, a processor 83, and a transceiver 85, the smartphone 75 is capable of capturing the user's touch input, which is relayed back to the ECM 17. The replicated view may be accessible through an application on the smartphone 75, or, similarly, through a web interface, dedicated server, or other equivalent software. Such software is hosted on the vehicle 11 itself, on a dedicated server (not shown), on the smartphone 75, or a combination thereof. Accordingly, the user is able to manipulate and interact with the visualized vehicle 55, and thus the vehicle 11 itself, by interacting with the smartphone 75.

Figure 7:
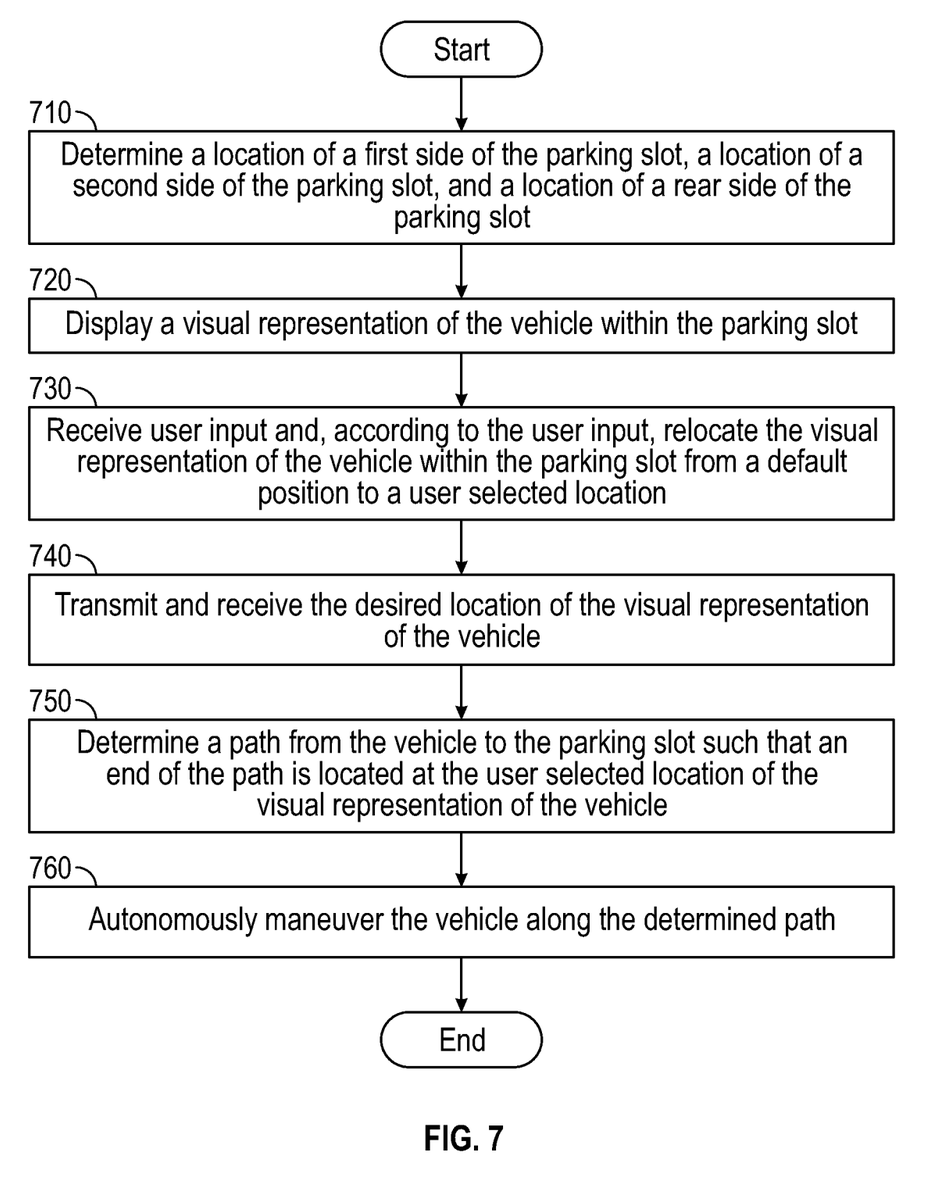
FIG. 7 shows a flowchart of a method in accordance with one or more embodiments of the present disclosure.

FIG. 7 depicts a flowchart illustrating a method for autonomously parking a vehicle 11 within a parking slot 37. Steps of the flowchart shown in FIG. 7 may be performed by an automated parking system as described herein, but are not limited thereto. As shown in FIG. 7, the method initiates in Step 710 by determining a first location of a first side of the parking slot 37, a second location of a second side of the parking slot 37, and a third location of a rear side of the parking slot 37 in relation to the vehicle 11, respectively. It is assumed that the vehicle 11 has been powered on and that the center console 21 is communicating with an ECM 17 that receives environmental data from a first sensor 13 and a second sensor 15 located within the vehicle 11. The ECM 17 performs feature extraction on the received environmental data, and identifies the location of the sides of the parking slot 37 using an object detection algorithm as described above.

Once the ECM 17 has determined the location of the vehicle 11 in relation to a parking slot 37, the ECM 17 displays a visual representation of the vehicle 11 at a default position within a visualized parking slot 56 on a display 53 of a center console 21 of the vehicle 11 in Step 720. The visualized vehicle 55 includes visualized driver side doors 32, visualized passenger side doors 34, and a rear door 35 of the vehicle 11, as well as their associated operating positions, which are expressed both in terms of distance from the visualized vehicle 55 and a percent of a maximum operating position of the door(s). In addition, the default position of the visualized vehicle 55 within the visualized parking slot 56 is a position in which the center of the visualized vehicle 55 is located at the vertical and longitudinal center of the visualized parking slot 56. Alternatively, the ECM 17 may display the visualized vehicle 55 and the visualized parking slot 56 on a smartphone 75 by transmitting the visualized feed with a transceiver 73. Finally, the visualized vehicle 55 may be a two-dimensional visualization and/or a three-dimensional visualization, and the user may switch between the two by interacting with a prompt on the center console 21.

In Step 730, the center console 21 receives input from a user of the vehicle 11, and, according to the user's input, relocates the visual representation of the vehicle 11 from a default position to a user selected location 47. Specifically, the user interacts with buttons 67 of a touchscreen 63 of the center console 21, which vertically or longitudinally translate the visualized vehicle 55 across the display 53 according to the user's input. Concurrently, the display 53 displays feedback to the user by changing the displayed operating positions of the doors of the visualized vehicle 55 according the location of the visualized vehicle 55. As the visualized vehicle 55 is translated within the visualized parking slot 56, the ECM 17 calculates the distance between the center of the visualized vehicle 55 and the sides of the visualized parking slot 56 and updates the operating positions of the various doors according to the determined distance, as described above.

In step 740, the center console 21 transmits the user selected location 47 to the ECM 17. The ECM 17 may determine that the current position of the visualized vehicle 55 is the user selected location 47 for parking the vehicle 11 according to a variety of methods. For example, if the ECM 17 does not receive input from the touchscreen 63 for a period of time (e.g., 5, 10, or 15 seconds), the ECM 17 determines that the location of the visualized vehicle 55 at the last user input transmitted by the touchscreen 63 is the user selected location 47. Alternatively, the ECM 17 may issue a prompt on the display 53 of the center console 21 requesting that a user confirm the location of the visualized vehicle 55 as the user selected location 47, and the ECM 17 determines that the last user input transmitted by the touchscreen 63 is the user selected location 47. Regardless of the method used, because the touchscreen 63 transmits information indicating that the user has selected a desired parking location, the transmission of a user's input by the touchscreen 63 forms the step of transmitting the desired location of the visualized vehicle 55 within the visualized parking slot 56. Furthermore, because the ECM 17 is aware of the position of the center of the visualized vehicle 55 within the visualized parking slot 56, the ECM 17 maneuvers the vehicle 11 to the user selected location 47 by setting the received location of the visualized vehicle center 57 as the user selected location 47. Finally, and as noted above, the user's input is transmitted between the touchscreen 63 and the ECM 17 by way of a data bus 19.

In step 750, the ECM 17 determines a path from the current location of the vehicle 11 to the user selected location 47. As described above, the ECM 17 stores an object detection algorithm and the environmental data on a memory 20, and uses the object detection algorithm to perform feature extraction and determine the location of various objects in the surroundings of the vehicle 11. Based upon the location of the sides of the parking slot 37, the location of the vehicle 11, and any obstacles located between the vehicle 11 and the parking slot 37, the ECM 17 processes the environmental data through a path planning algorithm that determines a series of waypoints 29 that form a planned path 27. In order to determine the series of waypoints 29, the ECM 17 may, for example, use a cost function to evaluate whether a potential waypoint adequately positions the vehicle 11 closer to the user selected location 47. The ECM 17 then proceeds to successively determine potential waypoints 29 using the cost function, which forms the planned path 27 to the user selected location 47.

Once a valid combination of waypoints 29 are determined, the ECM 17 subsequently issues actuation commands to the vehicle 11 such that the vehicle 11 maneuvers through the successive waypoints 29 that form the planned path 27 in step 760. In particular, the ECM 17 determines a series of speed and steering commands that are issued to the vehicle 11 to maneuver the vehicle 11 to the next waypoint 29 along the planned path 27. A speed command may be, for example, a command for the vehicle 11 to accelerate to a certain velocity, while a steering command may be, for example, a command for the vehicle 11 to rotate its steering wheel to a specific degree to steer the vehicle 11 towards the next waypoint 29. Once the vehicle 11 has successfully maneuvered through each waypoint 29 of the planned path 27, the vehicle 11 is located at the user selected location 47.

Accordingly, embodiments disclosed herein provide the advantage of allowing a user to automatically park a vehicle at a location selected by the user within the parking slot. In addition, an Electronic Control Module (ECM) of the vehicle calculates the degree that the various doors of the vehicle may be opened without crossing over a side of the parking slot, in the case that the side of the parking slot is formed by an object or obstacle that substantially inhibits the operation of the door(s). Alternatively, if the ECM determines that the side of the parking slot does not inhibit the operation of the door(s) (such as if the side of the parking slot is painted on the ground and the parking slot resides in a relatively empty parking lot), the ECM determines that the applicable door(s) may be fully opened.

The degree of operation of the doors is displayed to a user on a center console of the vehicle, which provides the user with the ability to orient the vehicle within the parking slot according to a desired use case. For example, if the user is planning to load a large object into the trunk of the car, the user may wish to park towards the front of the parking slot, in order to have more space at the rear of the vehicle to load the large object. In such cases, the user will position a visualized vehicle towards the front of the slot on a center console of the vehicle, and the ECM of the vehicle will determine a valid path to maneuver the vehicle to the user selected location. Thus, embodiments of the invention as described herein advantageously provide the ability for a user to park a vehicle within a parking slot according to the use case of the vehicle.

Although only a few example embodiments have been described in detail above, those skilled in the art will readily appreciate that many modifications are possible in the example embodiments without materially departing from this invention. For example, although embodiments of the invention are directed towards selecting a location for a vehicle within a single parking slot, the center console may depict a series of open parking slots within the environment of the vehicle. The user may then select which parking slot the user desires to park in prior to selecting a location for the vehicle within the parking slot, which provides the user with more control over the location of a vehicle as a whole. In addition, the center console may prompt the user to select whether the car should be forward driven or reversed into the parking slot, and the path planning algorithm may determine the path of the vehicle accordingly. Moreover, the ECM may automatically assume that if the parking slot is located behind the vehicle the vehicle must be reversed into the parking slot, while if the parking slot is located in front of the vehicle the vehicle will be forward driven into the parking slot. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. An automated parking system for parking a vehicle within a parking slot, the system comprising:
   a communication device comprising:
   a display configured to depict a visual representation of the vehicle within the parking slot;
   a human machine interface (HMI) configured to receive user input and, according to the user input, relocate the visual representation of the vehicle on the display within the parking slot from a default position to a user selected location; and
   a first data bus configured to transmit the user selected location of the visual representation of the vehicle within the parking slot; and
   an automated parking device comprising:
   a sensor configured to determine a first location of a first side of the parking slot, a second location of a second side of the parking slot, and a third location of a rear side of the parking slot in relation to the vehicle, respectively;
   a second data bus configured to receive the user selected location of the visual representation of the vehicle;

an electronic control module configured to:
  determine a path from the vehicle to the parking slot such that an end of the path is located at the user selected location of the visual representation of the vehicle;
  determine a percentage and a distance that at least one door may be opened before the at least one door abuts against the first side, the second side, the rear side of the parking slot, or is in a maximum operating position, and
  autonomously maneuver the vehicle along the determined path,
wherein the visual representation of the vehicle includes both a three-dimensional bowl view of the vehicle and a two-dimensional overhead view of the vehicle, and
wherein the visual representation of the vehicle comprises the at least one door of the vehicle in an open position and the percentage and the distance that the at least one door may be opened.

2. The system of claim 1, wherein the sensor is further configured to determine a length of the parking slot.

3. The system of claim 1, wherein the sensor is further configured to determine a width of the parking slot.

4. The system of claim 1, wherein the communication device is a center console of the vehicle, and the display and the HMI are elements of a touchscreen of the center console.

5. The system of claim 1, wherein the sensor is a camera, a LiDAR sensor, a radar sensor, or an ultrasonic sensor disposed in the vehicle or in local infrastructure.

6. The system of claim 1, wherein the electronic control module is further configured to:
  determine the path from the vehicle to the parking slot as a series of waypoints, and
  autonomously maneuver the vehicle through the waypoints.

7. The system of claim 1, wherein the percentage is determined as a ratio of the open position of the at least one door to the maximum operating position of the at least one door.

8. The system of claim 1, wherein the distance is determined based on a body width of the vehicle and the at least one door of the vehicle, when the at least one door of the vehicle is in the open position.

9. The system of claim 1, wherein the at least one door comprises a driver side door, a passenger side door, a rear door, a tailgate, or a trunk of the vehicle.

10. The system of claim 1, wherein the visual representation of the vehicle further comprises a plurality of doors of the vehicle in the open position, the plurality of doors comprising at least one of a driver side door, a passenger side door, and a rear door of the vehicle.

11. A method for parking a vehicle within a parking slot, the method comprising:
  determining a first location of a first side of the parking slot, a second location of a second side of the parking slot, and a third location of a rear side of the parking slot in relation to the vehicle, respectively;
  displaying a visual representation of the vehicle within the parking slot;
  receiving user input and, according to the user input, relocating the visual representation of the vehicle within the parking slot from a default position to a user selected location;
  transmitting and receiving the user selected location of the visual representation of the vehicle within the parking slot;
  determining a path from the vehicle to the parking slot such that an end of the path is located at the user selected location of the visual representation of the vehicle;
  determine a percentage and a distance that at least one door may be opened before the at least one door abuts against the first side, the second side, the rear side of the parking slot, or is in a maximum operating position; and
  autonomously maneuvering the vehicle along the determined path,
wherein the visual representation of the vehicle includes both a three-dimensional bowl view of the vehicle and a two-dimensional overhead view of the vehicle, and
wherein the visual representation of the vehicle comprises the at least one door of the vehicle in an open position and the percentage and the distance that the at least one door may be opened.

12. The method of claim 11, further comprising:
  determining the path from the vehicle to the parking slot as a series of waypoints, and
  autonomously maneuvering the vehicle through the waypoints such that the vehicle is driven along the determined path.

13. The method of claim 11, further comprising: determining a length of the parking slot.

14. The method of claim 11, further comprising: determining a width of the parking slot.

15. The method of claim 11, wherein the at least one door comprises a driver side door, a passenger side door, a rear door, a tailgate, or a trunk of the vehicle.

16. The method of claim 11, wherein the visual representation of the vehicle further comprises a plurality of doors of the vehicle in the open position, the plurality of doors comprising at least one of a driver side door, a passenger side door, and a rear door of the vehicle.

* * * * *